United States Patent

[11] 3,614,060

| [72] | Inventors | Jacob B. Freed;<br>Donald R. Disbrow, both of Battle Creek, Mich. |
|---|---|---|
| [21] | Appl. No. | 843,563 |
| [22] | Filed | July 22, 1969 |
| [45] | Patented | Oct. 19, 1971 |
| [73] | Assignee | Union Pump Company<br>Battle Creek, Mich. |

[54] SLEEVED PLUG VALVE
17 Claims, 11 Drawing Figs.

| [52] | U.S. Cl. | 251/317 |
|---|---|---|
| [51] | Int. Cl. | F16k 5/04 |
| [50] | Field of Search | 251/317, 312, 309 |

[56] References Cited
UNITED STATES PATENTS

| 2,986,374 | 5/1961 | Rakus | 251/317 |
|---|---|---|---|
| 3,128,987 | 4/1964 | O'Conner | 251/317 X |
| 3,206,163 | 9/1965 | Freed | 251/317 X |
| 3,216,697 | 11/1965 | Holmberg | 251/317 X |
| 3,398,925 | 8/1968 | Scaramucci | 251/315 X |
| 3,326,519 | 6/1967 | Freed | 251/317 |
| 3,498,317 | 3/1970 | Duffey | 251/317 X |
| 3,498,318 | 3/1970 | Duffey | 137/375 |

FOREIGN PATENTS

| 1,091,134 | 10/1954 | France | 251/317 |
|---|---|---|---|

*Primary Examiner*—M. Cary Nelson
*Assistant Examiner*—Michael O. Sturm
*Attorneys*—Roy A. Plant and William W. De Witt ABSTRACT: A sleeved plug valve having flow-throttling lug members at the ports in the valve body, such lug members constituting raised, islandlike projections from the walls of the valve chamber located immediately adjacent the side edge of the ports in the direction of throttling or closing plug movement, such lug members extending circumferentially of their respective ports only along such side edge and having a length which is only a minor portion of the total port circumference, and such lug members having a minimum width at their widest point which is a function of the maximum port dimension of the valve.

INVENTORS
J.B. FREED
D.R. DISBROW
BY
Roy A. Plant
ATTORNEY

INVENTORS
J. B. FREED
D. R. DISBROW
BY
Roy A. Plant
ATTORNEY

INVENTORS
J.B. FREED
D.R. DISBROW

BY

Roy A. Plant
ATTORNEY

INVENTORS
J.B. FREED
D.R. DISBROW

BY Roy A. Plant
ATTORNEY

SLEEVED PLUG VALVE

BACKGROUND OF THE INVENTION

This invention relates to plug valves of the type having relatively thin sleeves or liners disposed between the plug and the walls defining the valve chamber or cavity.

As is well known, plug valves can be lined with any of a variety of sleeve materials to improve their operating characteristics in particular environments. This approach is most often taken where the valve is to be used to control the flow of a highly corrosive or active fluid such as an acid, alkali, or other analogous corrosive chemical compound. Normally, the liner material selected is a lubricous plastic of an extremely inert and resistant character, and the polytetrafluoroethylene materials sold commercially under the trademark "Teflon" have proved to be highly suitable for such usage.

While lined plug valves of the type just mentioned have proved to be quite effective in a general way, there nonetheless have been numerous different problems in their manufacture and usage, and considerable development effort has been devoted to the improvement of such valves. One of the principle reasons underlying such problems is the physical character of the synthetic plastics referred to, which have a coefficient of thermal expansion that is many times that of the metals forming the valve body and plug with which the plastic liners are used, together with the fact that thermal expansion of the plastic is not followed by corresponding contraction in the presence of decreased temperatures. One of the principal failures in lined valves of this character resulting from the foregoing factors is what is popularly known as "blowout" of the liner in which the liner material becomes distended and distorted at a port opening as a result of elevated temperatures and other factors, and is then forced away from the walls of the valve chamber adjacent the ports by the flow of the fluid being controlled as the plug is moved closer and closer to its closed position. This causes the trailing edge of the port or passage in the plug to snag the distorted liner adjacent the port in the valve body and, upon final rotation of the plug to a closed position, to tear and shear off a portion of the liner, causing malfunction of the valve.

Considerable effort has been spent in the past in an effort to find a complete solution to the aforementioned problem. For example, it has been suggested that the sleeve should have larger port openings than the valve body itself, and that the edges of such larger port openings in the sleeve should be isolated from the edges of the port openings in the valve body by a narrow circumferential lip or ridge extending around the latter. This approach is effective under certain circumstances and conditions, but many combinations of temperature, pressure, and/or fluid flow velocity conditions exist under which the sleeve or liner will nonetheless suffer blowout, and such failures do continue to occur.

Another proposed solution, set forth in U.S. Pat. No. 2,987,295, is to offset the plug port or passage with respect to the valve body ports so that the flow through the valve is stopped at the downstream end of the plug port while the upstream end thereof is still exposed to the pressure in the line, thus eliminating any pressure drop at the upstream end of the plug port before the latter moves into a closed position. This solution, although relatively effective in preventing sleeve blowout, is not without its own significant limitations. Of these, one of the most important is the fact that such a configuration dedicates and restricts the valve to installations where the flow is always in only a single direction, and restricts to the point of substantial elimination any use in a multiport configuration (i.e., more than a single inlet and single outlet port). The problems and difficulties likely to be encountered in both the manufacture and use of such a unidirectional valve are well known, and indeed notorious, in the art, and include the fact that the plug must be inserted into the valve cavity in a single predetermined position and thus is often incorrectly installed, as well as the fact that the valve itself is likely to be installed in the line in the wrong orientation, causing immediate malfunction. Also, even if properly manufactured and installed, conditions of line operation are likely to result in at least occasional reverse surges and backflows, during which the unidirectional valve is subjected to conditions which by its very design and nature it is not equal to.

SUMMARY OF THE INVENTION

Unlike previous improvements in sleeved plug valves based primarily on the concept of offsetting or eliminating pressures exerted on the liner at the valve inlet port, the present invention is based on the concept of eliminating liner blowout by controlling the harsh jetting action of the fluid to which the liner is exposed during the closing of the valve. This is accomplished by throttling the fluid flow in a unique manner and thus by operating on its velocity rather than on its pressure. In accordance with the invention, a completely multidirection valve is provided which eliminates liner blowout while at the same time completely avoiding the limitations of unidirectional valves, by reducing the velocity of the fluid at the time of valve closure in a predetermined controlled manner.

It is thus a major objective of the present invention to provide an improved sleeved plug valve wherein a unique configuration at the valve body ports within the valve chamber safely retains the liner against deformation by the fluids being controlled and provides a positive means for throttling the fluid flow through the valve without disturbing the liner. Further, another objective of the invention is the provision of a novel port configuration within the valve chamber cooperating with the flow-throttling means and seating the liner annularly about the valve ports in a secure and reliable manner which supports the liner against thermal and other forces tending to deform it into the plug port, where the liner would be sheared or torn by movement of the plug. It is also an objective of the invention to provide the aforementioned characteristics in a sleeved valve which greatly minimizes the total volume of liner material required to reduce the thermal expansion of the liner while simplifying construction and assembly of the valve.

In accordance with the objectives of the invention, a lined plug valve is provided which is fully bidirectional in flow-handling capabilities, and in which the plug is freely movable in opposite directions with complete facility and without tendency toward blowout of the plastic liner. Thus, the major advantages of the invention are a significantly more reliable sleeved plug valve having significantly improved operational characteristics when compared to sleeved valves of the type used heretofore.

Briefly stated, the plug valve of the invention comprises a valve body with an interior chamber defined by walls having at least two port openings therein communicating with the chamber, a plug member movably disposed within the chamber to control flow therethrough from one such port opening to another by relative movement of the plug to selectively position a port extending through the latter, a liner element generally disposed between the plug and the chamber walls, and including a lug member located immediately adjacent a side of the port openings and in lateral alignment with the plug port in the direction in which the plug is movable to close the valve. The lug member comprises an islandlike projection from the chamber wall toward the interior of the chamber, and the lug extends along only a portion of the circumference of the port. The lug has a width from the edge of the port opening in the closing direction of plug travel which is preferably at least about one-eighth its overall length and at least about one-sixteenth the widest dimension of the port opening, and the projecting end surface of the lug is generally complementary in configuration to that of the plug, which sweeps across such surface when the valve is closing to throttle the flow of fluid through the valve over the lug.

IN THE DRAWINGS

PREFERRED EMBODIMENT

Figure 8:
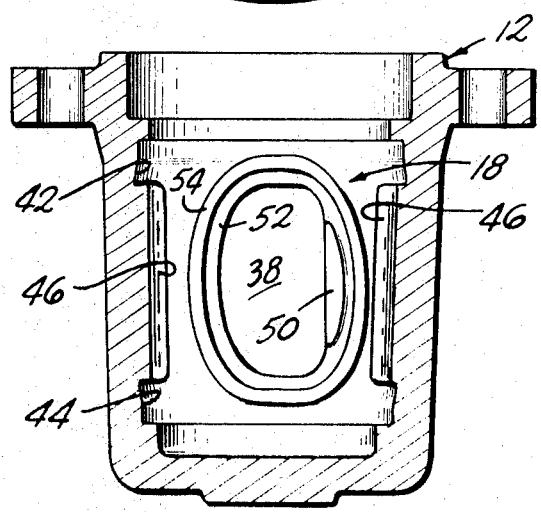
FIG. 8 is a fragmentary sectional end view similar to FIG. 4 but showing the plug and liner removed to illustrate the interior configuration of the valve chamber.
Figure 9:
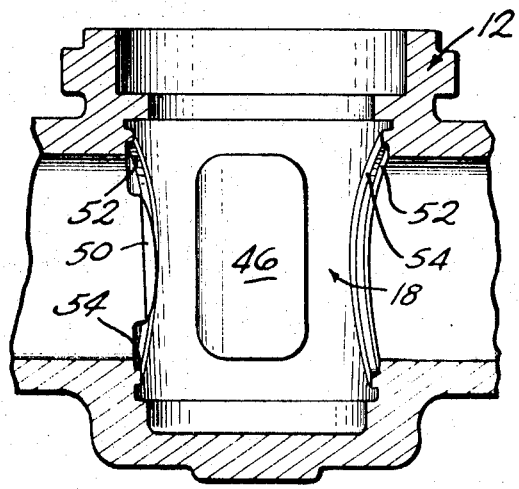
FIG. 9 is a fragmentary, sectional side elevation of the structure shown in FIG. 8.

The overall, general nature of the valve 10 of the invention will be readily appreciated by those skilled in the art. Basically, the valve 10 includes a valve body 12 having a pair of oppositely disposed end flanges 14 and 16 by which the valve is mounted in a desired fluid-transferring line, with the valve body defining a central internal cavity or chamber 18 (details of which are shown in FIGS. 8 and 9), in which a plug 20 is movably seated. Generally speaking, the valve cavity 18 and the plug 20 are cylindrical, although the same may converge conically toward the bottom of the valve chamber at least slightly, in order to augment proper seating of the plug and, hence, proper sealing. As will be described in more detail hereinafter, the interior configuration of the valve chamber 18 is such as to receive a sleevelike plastic liner member 22, of the general character referred to hereinabove, which fits between the walls of the chamber and the plug 20 to seal the plug within the chamber.

Figure 3:
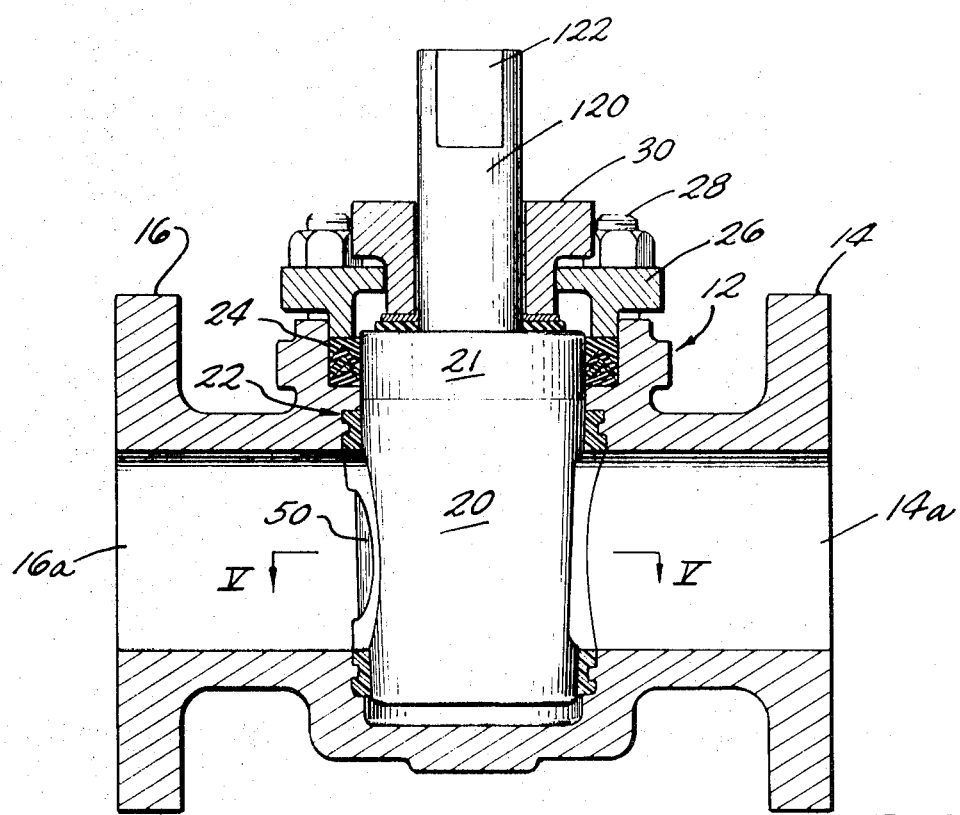
FIG. 3 is an enlarged sectional side elevation taken through the plane III—III of FIG. 2.
Figure 4:
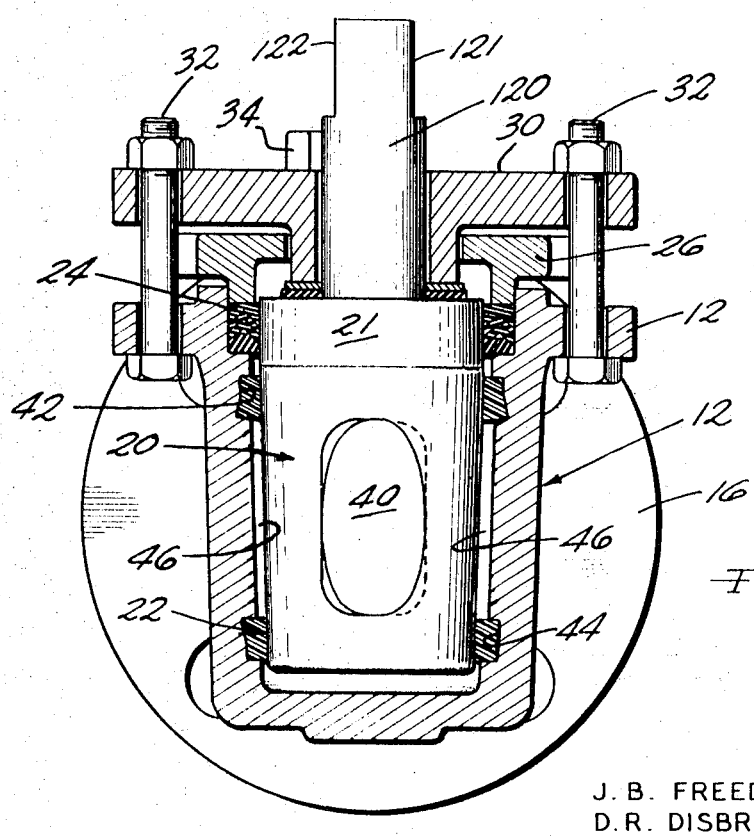
FIG. 4 is an enlarged sectional end elevation taken through the plane IV—IV of FIG. 1.

As illustrated, the uppermost portion 21 of the plug 20 may have a genuinely cylindrical configuration, and is encircled by a sealing means 24 (FIGS. 3 and 4), shown as a V-packing, which seats within an annular recess formed at the top of the valve body. The seal or packing 24 is compressed by a gland member 26, which comprises a generally rectangular plate having a protruding annular shoulder which contacts the seal 24. A plurality of bolts 28 passing through appropriate flange openings in the valve body 12 secure the gland member 26 in place and, by selective tightening, apply compression loading to the seal 24 to force it downwardly against the valve body and outwardly against the upper portion 21 of the plug. The plug has an axially extending shank or stem 120, on which oppositely disposed flats 121 and 122 are formed, as is conventionally done, to receive a wrench by which the plug 20 may be turned. Also, the flats incidentally provide a readily apparent visual indication of the plug position.

Figure 1:
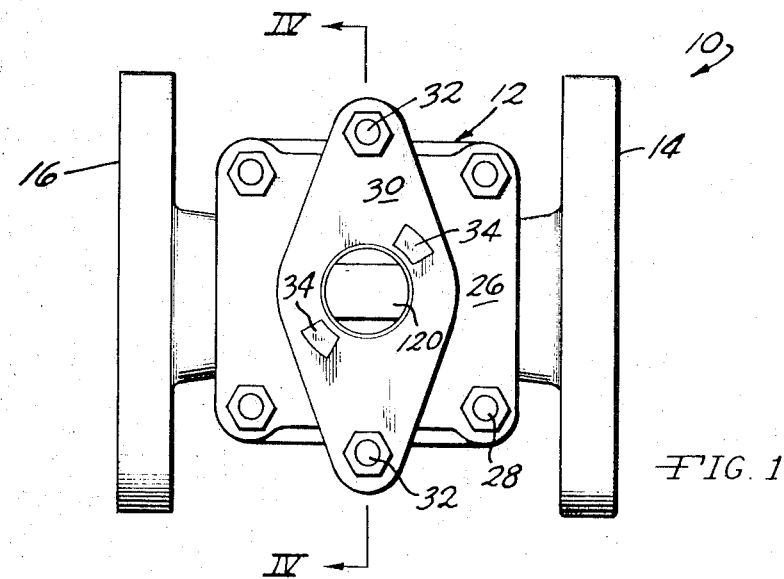
FIG. 1 is an overhead plan view of a valve in accordance with the invention.

Telescoped over the step 120 of the plug is a retainer element 30 having a protruding annular shoulder which extends inside a central opening in the gland member 26 and bears downwardly upon the top of the plug 20, through a pair of thrust washers or the like. As seen in FIG. 1, the retainer 30 extends laterally beyond the side edges of the gland member 26 to receive a pair of spaced bolts 32 extending upwardly from the valve body 12, such that selective tightening of the bolts 32 applies selective downward pressure to the plug 20 independently of the pressure applied to the seal 24 by the gland member 26. A pair of oppositely disposed abutments or stops 34 may be provided atop the retainer 30 for indexing the wrench or handle by which the plug stem 120 and plug 20 are rotated to operate the valve. As will be apparent, such stops or abutments are neither necessary or desired where the plug is to be movable in either direction 360°, as is possible in accordance with the invention.

Figure 2:
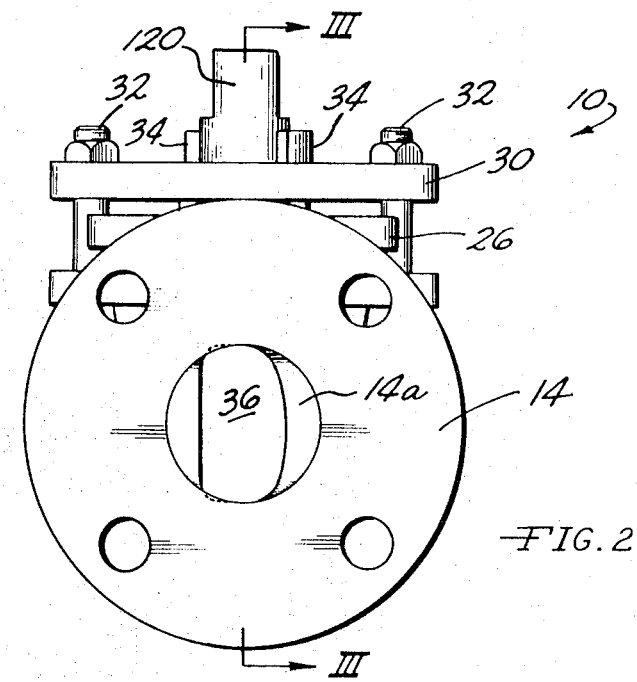
FIG. 2 is an end elevation of the valve shown in FIG. 1.

Each of the end flanges 14 and 16 of the valve body has a central opening 14a, 16a, respectively, which forms a port communicating with ports 36 and 38 in the walls of the valve chamber and opening into the interior thereof. As illustrated, while the port openings 14a, 16a in the end flanges may be circular in shape, the valve chamber ports 36 and 38 are preferably somewhat oral, having a considerably greater height (referred to variously herein and in the drawings as major or largest port diameter or dimension) than width. Also, in a valve whose plug is to be turned in only one direction to close the valve (whether continuously rotatable in such direction or not), the valve chamber ports may have one side which is substantially straight or linear (FIGS. 2 and 8). The plug 20 has a through port or passage 40 (FIG. 4), whose end openings have a shape complementary to that of the ports 36 and 38 in the valve body, with the plug port coming into full registration with the valve body ports when the plug is appropriately aligned.

The configuration of the interior walls defining the valve chamber 18 is of great importance to the invention, since this determines the effectiveness of the seating of the liner 22 and provides for a novel throttling operation where the plug 20 is rotated to a closed position, i.e., with the plug port 40 positioned out of registration with and normal to the valve body ports 36 and 38. Details of the chamber wall configuration are set forth hereinafter. It should be noted, however, that the walls of the valve chamber define an upper and lower annular recess 42 and 44, respectively (FIGS. 3, 4, and 8), for receiving corresponding shoulders formed around the top and bottom of the liner 22. Also, the walls of the valve chamber define a pair of bosses 46 positioned orthogonally with respect to the ports 36 and 38 and projecting away from the walls of the chamber and toward the plug 20. The bosses 46 are in lateral alignment with the ports 36 and 38 and thus will come into registration with the plug port 40 when the same is appropriately positioned, in the "off" or closed condition of the valve.

Figure 5:
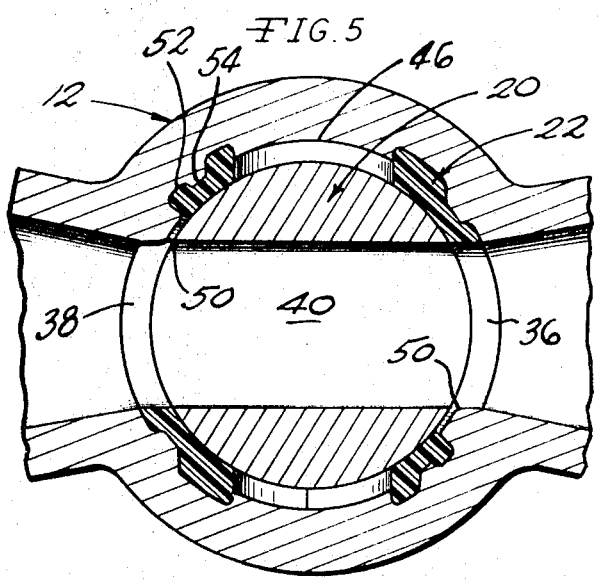
FIG. 5 is an enlarged sectional plan view taken through the plane V—V of FIG. 3.
Figure 10:
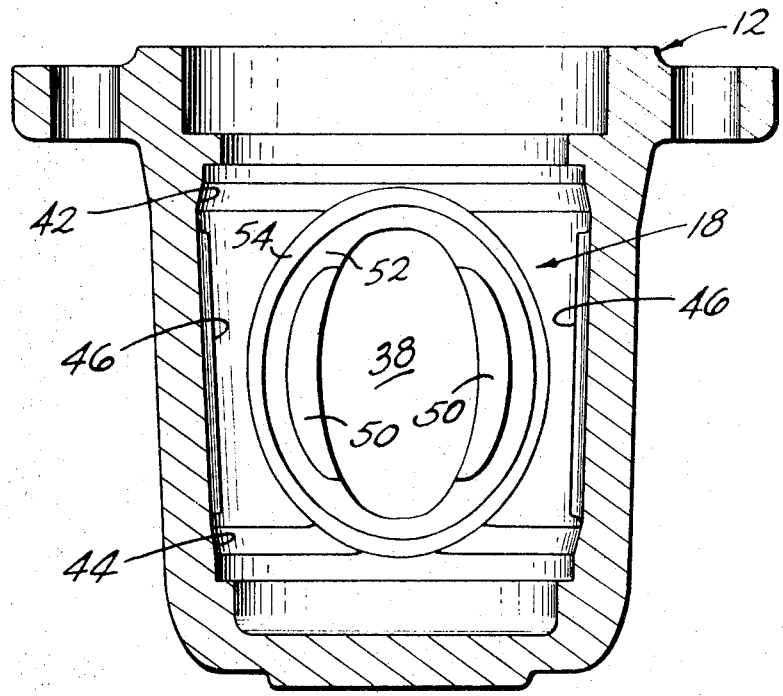
FIG. 10 is a fragmentary sectional view similar to FIG. 8 but showing an embodiment of the valve chamber for use in a valve having complete freedom of plug movement.

Of considerable importance to the invention is the presence of at least one throttling lug 50 located immediately adjacent at least one edge of each of the valve chamber ports 36, 38 (FIGS. 3, 5, 8 and 9). Each of the lugs 50 may be somewhat crescent shaped, and may generally be said to comprise an outward projection from the walls of the valve chamber, in effect forming an extension toward the interior of the chamber of the side of the port to which the lug is adjacent. As will be noted, the lugs 50 do not extend completely around the ports and, in a two-port valve where the plug need be turned only in 90° reciprocating movements to fully control flow through the valve, there need be only one of the lug projections adjacent each of the ports 36, 38, with each such lug being positioned diametrically opposite the other across the valve chamber (FIG. 5). In this configuration, the valve will provide completely satisfactory operation, even with bidirectional flow, where currently available valves have severe limitations. As illustrated in FIG. 10, it is eminently possible to use a pair of the throttling lugs 50 in laterally spaced orientation at each of the valve ports, flanking both sides thereof. This will provide for complete freedom of movement of the plug, allowing it to be continuously rotated a full 360°, and allowing such rotation in either direction, while simultaneously guarding against any forcing of the liner into the plug ports and resulting mutilation or damage of the liner upon additional movement of the plug. As stated, however, it is not necessary to utilize the additional such throttling lugs in order to provide a completely satisfactory bidirectional valve, if complete freedom of plug rotation is not essential.

The throttling lugs 50 project outwardly from the walls of the valve chamber very nearly to the outer periphery of the plug 20 (FIG. 5), but (like the bosses 46 referred to previously) preferably spaced slightly (on the order of one thirtysecond of an inch) outwardly of the point at which the plug and liner surfaces meet. The lugs have a generally cylindrical concave end surface immediately adjacent the plug 20 which is complementary in shape to the outer periphery of the plug. Thus, the plug can slide smoothly past the end surfaces of the throttling lugs in close proximity thereto as the valve is closed. When the valve is closed, the trailing edge of the plug port 40 progressively moves toward and across the edge of the throttling lugs disposed contiguous to the edge of the respective port, throttling the fluid flowing through the valve over the outer end of the lug in an ever-increasing degree. Thus, it is the throttling lug which is exposed to the harsh jetting action of the fluid as it is throttled, rather than the edge extremity of the plastic liner element. This protects the liner from such jetting and prevents it from being "blown out" or forced away from the edge of the port by the jetting fluid to a position where it would be snagged by the trailing edge of the plug port as the plug is moved to a fully closed position.

In effectively throttling the flow of fluid through the valve in the manner just stated, it has been determined that the width of the throttling lugs 50 is of considerable importance, since certain minimum widths exist which a thin rail or ridge, for example would not satisfy. The approximate minimum desirable width for throttling lugs used in conjunction with valve ports of varying diametral sizes is illustrated by the graph shown in FIG. 11, which depicts a curve generated by empirical methods. While this curve is thus an approximation, it will serve as a graphic illustration of the principles involved, and in a reasonably accurate (within perhaps 20 percent or thereabouts) and quite useful manner it sets forth appropriate minimal lug widths for different-sized valve ports, for conditions of fluid temperature in the normal range, i.e., not exceeding about 220° F. The curve is useful for higher temperature conditions, but the minimum widths indicated may have to be proportionately widened as a function of the increased temperature. Thus, from the curve it will be noted that, for example, a valve having a port with a diameter of 2 inches along its major or transverse axis (a common size) should have throttling lugs 50 with a minimum width at their widest point of approximately three-sixteenths inch, 3'16 inches, for the normal temperature range referred to above.

Figure 11:
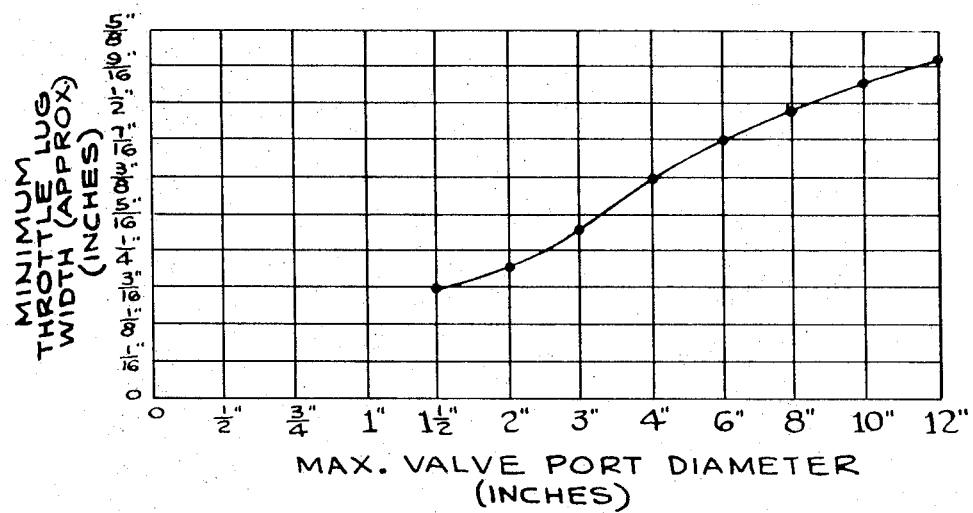
FIG. 11 is a graph illustrating throttle lug width relationships.

In connection with the cross-sectional shape of the throttling lugs, it is to be noted that while the crescent shape referred to hereinabove is somewhat preferable, the specific shape of the lugs is not a matter of critical concern, so long as the minimum width conforms generally to the curve shown in FIG. 11 and is in accordance with the principle of complete throttling of fluid flow across the face of the lug, rather than on an edge of the plastic liner. In this connection, it is to be noted that certain extremely harmonious or advantageous widths of the throttling lugs also exist as a ratio of the length thereof which, as will be observed, is considerably less than half the overall circumference of the port to which the lug is adjacent. As a general rule, a width-to-length ratio of one to eight will be found to produce very satisfactory throttling effects. From the curve shown in FIG. 11, it may be seen that a similar such figure for any width-to-port diameter ratio is on the order of from two or three to about 32.

In addition to the throttling lugs 50 mentioned just above, and in addition to the annular recesses 42 and 44 around the top and bottom of the valve cavity and the bosses 46, all mentioned previously, the interior of the valve chamber also defines a generally annular relief or groove 52 (FIGS. 5, 8 and 9) extending around the immediate inside edge of each of the ports 36, 38, from one end of the throttling lug 50 to the other, and also immediately outwardly of the lug, around the side edge thereof which is furthest from the port opening. Also, the valve chamber walls define a generally annular ridge 54 extending around the relief or groove 52. Between the ridge 54 and the protruding bosses 46 noted previously, the walls of the valve chamber are at the recessed level of the relief 52, and the plastic liner 20 fills all such areas, as well as filling the relief 52 around each of the ports. The liner 22 is, of course, provided with openings for registration with each of the ports 36, 38 and also with each of the bosses 46. Consequently, the total amount of material required for the liner is reduced considerably and this provides benefits in excess of the mere cost of material saved, which is nonetheless quite significant. For one thing, the total volume of plastic present which is available to be subjected to the elevated temperatures which cause thermal expansion is reduced. Thus, the problem of thermal creep and extrusion of the plastic liner is commensurately diminished. Furthermore, the bosses 46 fit within the corresponding openings in the liner and help considerably in indexing the liner within the valve chamber and resisting relative movement of the liner under the influence of the tightly fitting plug when the latter is rotated. Additionally, a small amount of leakage of fluid between the liner and the walls of the valve chamber is, as a practical matter, almost inevitable, and the presence of the openings in the liner at the bosses 46, which come into registration with the plug port 40 in the closed condition of the valve, provides a ready means for relieving any fluid present behind the liner.

The presence of the throttling lugs 50, particularly in conjunction with the annular relief or groove 52 and its concentric ridge 54, also help in retaining the liner in its proper position. That is, resistance to creep or extrusion of the liner and to sliding rotational movement thereof is further considerably augmented by the interfitting groove-and-ridge relationship between the liner and the valve chamber walls at the ports, as well as the abutting edge-to-edge relationship of the curving side of the throttling lugs and the adjacent edge of the plastic liner.

Figure 6:
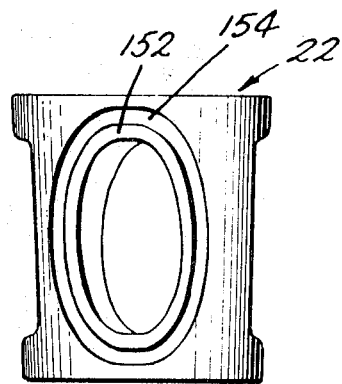
FIG. 6 is a front elevational view of the liner used in the valve.
Figure 7:
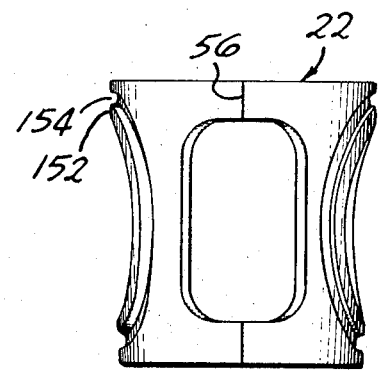
FIG. 7 is a side elevation of the liner shown in FIG. 6.

As indicated by the butted edges 56 shown in FIG. 7, the liner 22 may be formed from plastic material molded or otherwise manufactured in flat form, with the appropriate openings for the ports 36, 38 and the bosses 46 provided in place. In this condition, the generally concentric ridges and grooves designated 152, 154 in the liner (FIGS. 6 and 7) which fit respectively into the relief 52 and ridge 54 of the valve chamber walls, do not have to be preformed. Instead, the flat liner blank is rolled into generally tubular form and inserted into the valve chamber, and the plastic of which the blank is formed is forced to flow under pressure (and, if necessary, heat) into the grooves or recesses formed in the walls of the valve chamber, thereby providing an exact mating fit between the valve chamber and the liner.

The resulting sleeved valve made in accordance with the foregoing exhibits extremely good sealing characteristics and resistance to liner deformation and movement within the valve cavity, particularly as a result of the relief or recesses 52 at the edge of the ports 36 and 38 and encircled by the ridge 54. A major and principal advantage is provided by the presence of the throttling lugs 50, which act to eliminate the cause of liner blowout and tearing or other such destruction. At the same time, the general advantages to be obtained from sleeved valves are also enjoyed, including extremely great corrosion resistance and ease of operation, as well as freedom from plug lockup due to the lubricity of the plastic liner.

It is entirely conceivable that upon examining the foregoing disclosure, those skilled in the art may devise particular embodiments of the concepts forming the basis of the invention which differ somewhat from the preferred embodiment shown and described herein, or may make various changes in structural details to the present embodiment. Consequently, it is to be recognized that the preferred embodiment shown and described is for purposes of general illustration only and is in no way intended to illustrate all possible forms of the invention.

We therefore particularly point out and distinctly claim as our invention:

1. In a plug valve, of the type having a valve body with an elongated generally cylindrical interior chamber defined by walls having at least two port openings therein communicating with said chamber, having an elongated plug member with a through port movably disposed within said chamber to control flow therethrough between predetermined such port openings, and having an elongated generally sleevelike liner means seating said plug within said chamber and defining openings disposed generally in registry with said port openings, the improvement comprising: a lug member located adjacent at least one of said port openings, in lateral alignment with at least a portion of said plug port and at the side of such port opening toward which the plug is movable to close the valve, said lug member comprising an islandlike projection from and integral with said chamber wall into said chamber and generally toward the central area thereof; said lug member having a length dimension in a direction circumferentially of such port opening which is only a minor portion of the total circumference of such opening; said lug member having a side edge which defines its width and which is spaced from said port opening side in said direction of plug movement; and the said liner member opening which is in general registry with such port opening having an edge extremity lying in juxtaposition to and in flanking relation with such lug member side edge and wherein said lug member has a width at its widest point which is at least on the order of one-eighth its said length.

2. The improvement in a plug valve defined in claim 1, wherein said lug member has an end surface spaced inwardly of said chamber with respect to portions of the walls thereof which has a configuration that is substantially continuously complementary to the outer peripheral surface of said plug member in the area of said plug port.

3. The improvement in a plug valve defined in claim 1, wherein said lug member has a second side edge which is substantially flush with the said side of the said port opening to which said lug member is adjacent, said flush lug member side edge comprising in effect an extension into said chamber of said port opening side.

4. The improvement in a plug valve defined in claim 1, wherein said chamber wall defines a groovelike recess extending generally between opposite ends of said lug member around remaining portions of the periphery of the said port opening to which said lug is adjacent.

5. The improvement in a plug valve defined in claim 5, wherein said recess is generally contiguous to the peripheral edge of said port opening.

6. The improvement in a plug valve defined in claim 5, wherein said chamber walls further define a ridgelike portion effectively protruding into said chamber with respect to said groovelike recess and located adjacent the latter, said ridgelike portion extending circumferentially around substantially the entire excursion of said recess.

7. The improvement in a plug valve defined in claim 6, wherein said recess extends between said lug member side edge and said ridgelike portion.

8. The improvement in a plug valve defined in claim 1, wherein said liner means further defines at least one secondary opening therethrough located between said liner openings which are in registry with said port openings, said secondary openings being located in lateral alignment with said plug port and in registry with a position occupied by said plug port when the plug is moved within the chamber.

9. The improvement in a plug valve defined in claim 1, including a plural number of said lug members, each such lug member disposed adjacent a corresponding side of different ones of said port openings.

10. The improvement in a plug valve defined in claim 9, including a pair of said lug members at certain of said port openings, each lug member in each such pair being disposed on the opposite lateral side of such port opening from the other lug member in the pair at that opening.

11. In a lines plug valve, having an elongated plug movable seated in a valve chamber and having a liner disposed generally between the plug and the walls of the chamber, said plug controlling flow between at least a pair of ports leading into and out of each chamber by selective positioning of a passage in said plug with respect to such ports, the improvement comprising: a flow-throttling lug disposed laterally adjacent at least one of said ports and extending generally circumferentially along at least a portion of the peripheral edge thereof; said lug projecting away from and integral with portions of said chamber walls generally around such port and extending toward the interior of said chamber a sufficient extent to form a narrow open space between the inner end extremity of the lug directly adjacent the outer surface periphery of said plug, and said inner end of said lug having a shape generally complementary to the outside of said plug, such that the plug sweeps across the lug end extremity when moved in a flow-stopping direction to throttle flow directly between the lug and the plug; and said lug having a width dimension in such direction of plug movement which is at least on the order of one-sixteenth the major diametral dimension of the port to which the lug is adjacent.

12. The improvement in a plug valve according to claim 12, wherein said throttling lug has a length along the circumference of said port which is only a minor portion of the entire such circumference.

13. The improvement in a plug valve defined in claim 12, wherein said lug member has a width at its widest point which is at least on the order of one-eighth its said length.

14. The improvement in a plug valve defined in claim 12, wherein said valve chamber walls define a groove extending at least partially around such port generally between opposite end portions of said lug, and wherein said liner forms a ridge seating in such groove.

15. The improvement in a plug valve defined in claim 14, wherein said groove and liner ridge are generally annular and encircle a major portion of said port.

16. The improvement in a plug valve defined in claim 14, wherein said chamber walls further define a ridge extending generally around said groove and disposed radially outwardly thereof with respect to said port, and wherein said liner forms a groove seating over such ridge.

17. In a lined plug valve, of the type having a plug movably seated in a valve chamber by a liner disposed generally between the plug and the walls of the chamber, to control flow between at least a pair of ports leading into and out of such chamber by selective positioning of a passage in said plug with respect to such ports, the improvement comprising: a flow-throttling lug disposed laterally adjacent at least one of said ports and extending generally circumferentially along at least a portion of the periphery thereof; said lug projecting away from portions of said chamber walls generally around such port and toward the interior of said chamber; said lug having an inner end extremity which is closely spaced from the periphery of said plug, such that the plug sweeps across the lug and extremity when moved in a flow-stopping direction to throttle flow therebetween; and said lug having a minimum width dimension in the direction of closing movement of said plug which is expressed as a ratio with respect to the major port diameter dimension of the valve, at least on the order of 2:32 for major port diameter dimensions in the range of 1½ inches to 4 inches, 1.8:32 for major port diameter dimensions in the range of 6 inches to 8 inches, and 1.2:32 for major port diameter dimensions in the range of 10 inches to 12 inches.

Union Pump P-301

PO-1050
(5/69)

UNITED STATES PATENT OFFICE
CERTIFICATE OF CORRECTION

Patent No. __3,614,060__ Dated __October 19, 1971__

Inventor(s) __Jacob B. Freed and Donald R. Disbrow__

It is certified that error appears in the above-identified patent and that said Letters Patent are hereby corrected as shown below:

Col. 8, line 2, Claim 11;
        "lines" should be ---lined---;
        "movable" should be ---movably---;

Col. 8, line 57;
        "and" should be ---end---.

Signed and sealed this 6th day of June 1972.

(SEAL)
Attest:

EDWARD M. FLETCHER, JR.
Attesting Officer

ROBERT GOTTSCHALK
Commissioner of Patents